United States Patent
Patel et al.

(10) Patent No.: US 10,091,825 B2
(45) Date of Patent: Oct. 2, 2018

(54) NETWORK-TO-NETWORK INTERFACE GATEWAY SYSTEM FOR PUSH-TO-TALK-OVER-CELLULAR SERVICE

(71) Applicant: Kodiak Networks Inc., Plano, TX (US)

(72) Inventors: Krishnakant M. Patel, Richardson, TX (US); Ramu Kandula, Plano, TX (US); Brahmananda R. Vempati, Dallas, TX (US); Harisha Mahabaleshwara Negalaguli, Richardson, TX (US); Bibhudatta Biswal, Richardson, TX (US); Basem Ahmad Ardah, Plano, TX (US)

(73) Assignee: KODIAK NETWORKS, INC., Plano, TX (US)

(*) Notice: Subject to any disclaimer, the term of this patent is extended or adjusted under 35 U.S.C. 154(b) by 74 days.

(21) Appl. No.: 15/013,548

(22) Filed: Feb. 2, 2016

(65) Prior Publication Data

US 2016/0227588 A1  Aug. 4, 2016

Related U.S. Application Data

(60) Provisional application No. 62/111,556, filed on Feb. 3, 2015.

(51) Int. Cl.
*H04W 4/10* (2009.01)
*H04W 76/00* (2018.01)
*H04W 88/16* (2009.01)

(52) U.S. Cl.
CPC ......... *H04W 76/005* (2013.01); *H04W 88/16* (2013.01)

(58) Field of Classification Search
CPC ....... H04W 76/005; H04W 4/10; H04W 4/08; H04W 92/02; H04W 4/02; H04W 88/16; H04W 8/183; H04L 12/66; H04L 65/4061; H04L 69/08; H04L 12/1836; H04L 12/189; H04M 15/55

See application file for complete search history.

(56) References Cited

U.S. PATENT DOCUMENTS

| | | |
|---|---|---|
| 2004/0203793 A1 | 10/2004 | Dorenbosch |
| 2005/0227722 A1 | 10/2005 | Harris et al. |
| 2006/0019681 A1* | 1/2006 | Harris ................. H04W 72/121 455/464 |

(Continued)

FOREIGN PATENT DOCUMENTS

WO  2010009261 A1  1/2010

*Primary Examiner* — Dong-Chang Shiue

(57) ABSTRACT

A network-to-network interface (NNI) device, including at least one push-to-talk (PTT) interface adapter, a processor connected to the at least one PTT interface adapter, and a non-transitory computer readable medium connected to the processor. The non-transitory computer readable medium has stored thereon instructions that, when executed by the processor, cause the NNI device to receive a first PTT communication in a first PTT format through the at least one PTT interface adapter from a first PTT system, translate the first PTT communication into a second PTT communication in one or more second PTT formats, and transmit the second PTT communication through the at least one PTT interface adapter to one or more second PTT systems.

21 Claims, 7 Drawing Sheets

(56) References Cited

U.S. PATENT DOCUMENTS

| | | | |
|---|---|---|---|
| 2006/0058008 A1* | 3/2006 | Choksi | H04W 4/10 455/406 |
| 2007/0058573 A1* | 3/2007 | Schwagmann | H04W 4/10 370/260 |
| 2007/0281723 A1* | 12/2007 | Chotai | H04L 65/4061 455/518 |
| 2008/0200162 A1* | 8/2008 | Chowdhury | H04L 12/1836 455/422.1 |
| 2009/0005100 A1* | 1/2009 | Copeland | H04L 65/4038 455/518 |
| 2009/0143090 A1 | 6/2009 | Mimura et al. | |

* cited by examiner

NETWORK-TO-NETWORK INTERFACE GATEWAY SYSTEM FOR PUSH-TO-TALK-OVER-CELLULAR SERVICE

This application claims the benefit of U.S. Provisional Application No. 62/111,556, filed on Feb. 3, 2015, which application is hereby incorporated herein by reference.

TECHNICAL FIELD

The present invention relates generally to a system and method communications systems, and, in particular embodiments, to a system and method for providing a gateway system connecting multiple push-to-talk (PTT) network systems.

BACKGROUND

The PTT user community is fragmented across several PTT systems, which are based on different technologies and are often incompatible with each other. PTT systems differ from standard direct or party calling system in that they require active management of user control during calls and centralized management of caller groups. Various PTT systems may use different communications and network management standards, as Open Mobile Alliance (OMA) push to talk over cellular (PoC), integrated digital enhanced radio (iDEN), Project 25 Console Subsystem Interface/Inter RF Subsystem Interface (P.25 CSSI/ISSI), terrestrial trunked radio (TETRA), digital mobile radio (DMR), or the like. These different PPT systems use different standards for managing call connections, for managing group membership, and for managing which caller has floor control, or which user is talking.

SUMMARY

An embodiment network-to-network interface (NNI) device, including at least one push-to-talk (PTT) interface adapter, a processor connected to the at least one PTT interface adapter, and a non-transitory computer readable medium connected to the processor. The non-transitory computer readable medium has stored thereon instructions that, when executed by the processor, cause the NNI device to receive a first PTT communication in a first PTT format through the at least one PTT interface adapter from a first PTT system, translate the first PTT communication into a second PTT communication in one or more second PTT formats, and transmit the second PTT communication through the at least one PTT interface adapter to one or more second PTT systems.

An embodiment method includes receiving a first push-to-talk (PTT) communication in a first PTT format at a network-to-network interface (NNI) device from a first PTT system, translating the first PTT communication into a second PTT communication in at least one second PTT format, and transmitting the second PTT communication by the NNI device to at least one second PTT system. In some embodiments, the method further includes emulating an interface of the at least one second PTT system to the first PTT system, and emulating an interface of the first PTT system to the at least one second PTT system.

An embodiment push-to-talk (PTT) device includes a communications interface, a processor connected to the communications interface, and a non-transitory computer readable medium connected to the processor. The non-transitory computer readable medium has stored thereon instructions that, when executed by the processor, cause the PTT device to synchronize one of a user identity mapping and a group identity mapping with a network-to-network interface (NNI) device, generate a first PTT communication message in a first PTT format, the first PTT message having data related to a call between a first user on the PTT device and a second user on a second PTT device that communicates in a second PTT format, and transmit the first PTT communication message to a network-to-network interface (NNI) device and through the NNI device to a second PTT device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In order to mediate between push-to-talk (PTT) systems using different standards, a system to facilitate intercommunication between users of different PTT systems is provided herein. A PTT-over-cellular (POC) network-to-network interface (NNI) gateway system is one such system which enables the users of, for example, an open mobile alliance (OMA) standards based PTT system instance to communicate with one or more other peer PTT systems. The peer PTT system may itself be system using the same standards, such as an OMA standards based PTT system, or may be based on a different PTT technology such as push to talk over cellular (PoC), integrated digital enhanced radio (iDEN), Project 25 Console Subsystem Interface/Inter RF Subsystem Interface (P.25 CSSI/ISSI), terrestrial trunked radio (TETRA), digital mobile radio (DMR), or the like. Additionally, the NNI gateway, in some embodiments, provides a system and methods for extending standards such as the OMA/third generation partnership project (3GPP) standards to enable PTT systems to interwork with one or more other PTT systems using different standards. Additionally, the NNI gateway, in some embodiments, enable PTT calls between users spread across two or more PTT systems that use different standards.

Figure 1:
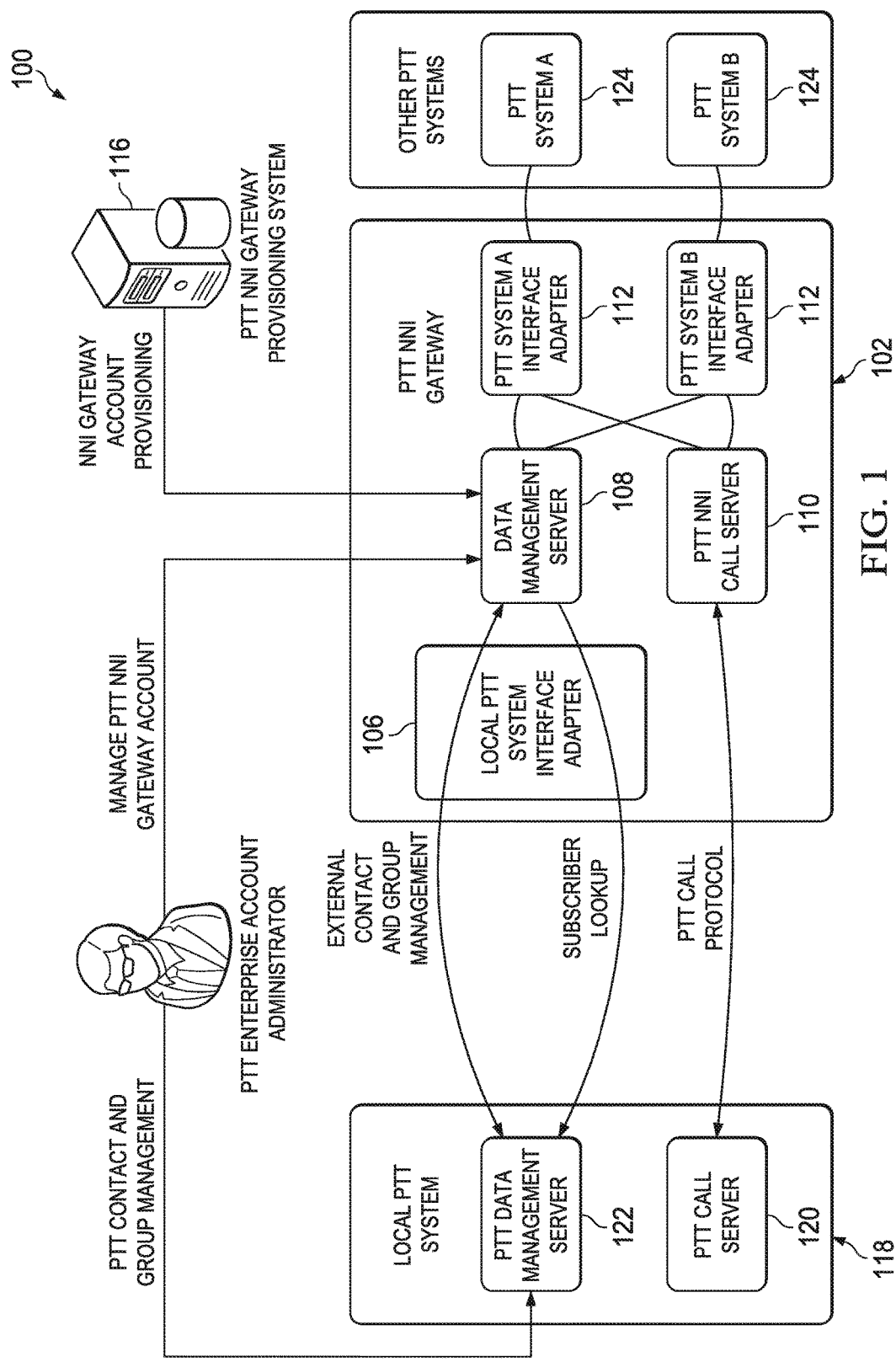
FIG. 1 is a diagram illustrating a PTT platform implementing an NNI gateway between a first PTT system and one or more second PPT systems according to some embodiments.
Figure 2:
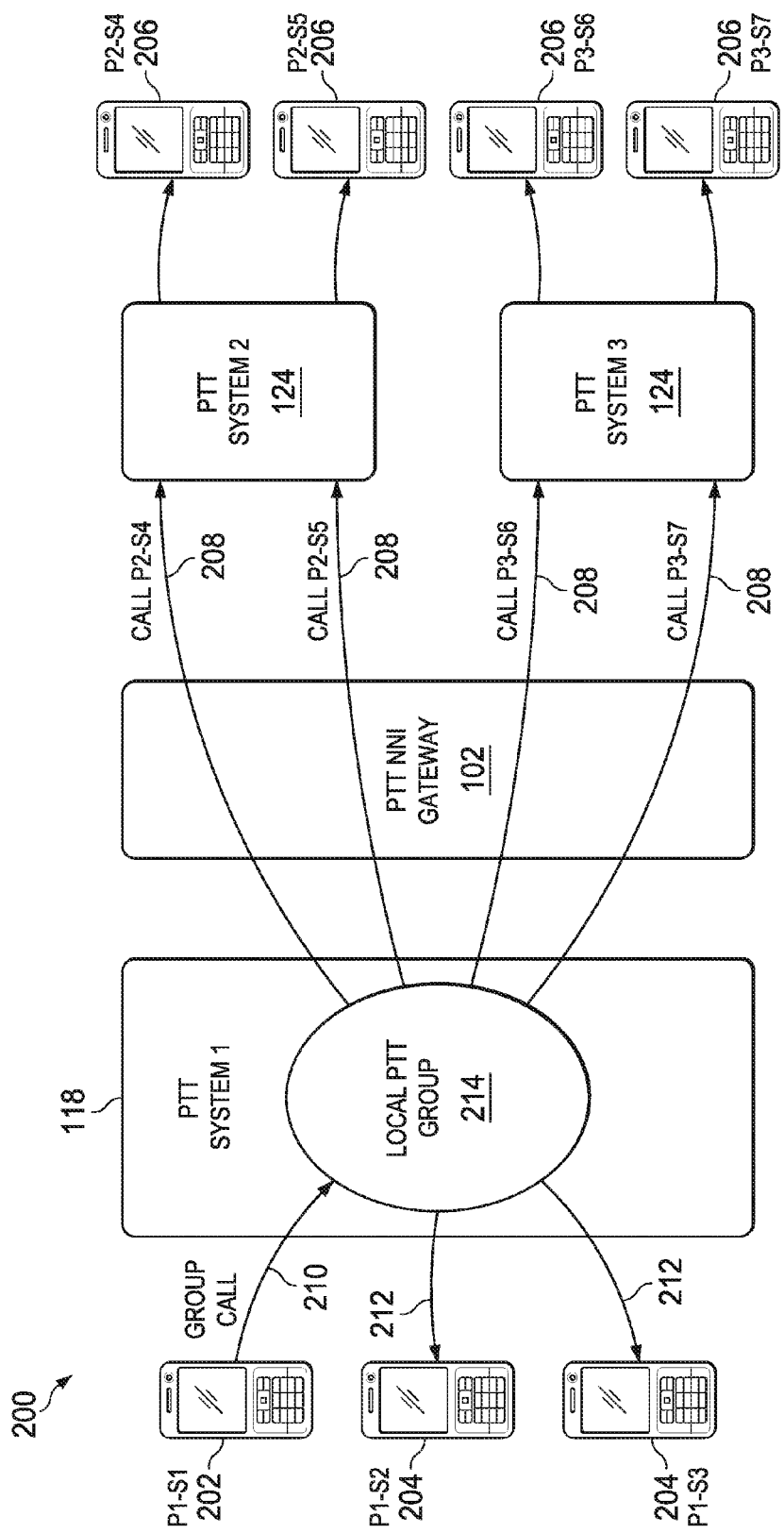
FIG. 2 is a logical diagram illustrating management by the PTT NNI gateway of PTT groups having users on remote PTT systems according to some embodiments.

FIG. 1 is a diagram illustrating a PTT network 100 implementing a PTT NNI gateway between a first PTT system 118 and one or more second PTT systems 124 according to some embodiments. It should be understood that the actual implementation of the PTT network 100 is not necessarily limited by the architecture described herein, and each PTT network 100 is governed by the respective technology specifications of the PTT network 100.

The PTT systems 118 and 124 may be connected to a client device, which may refer to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "PTT clients") reside on the client devices for accessing various PTT functions.

Client devices may communicate with PTT systems 118 and 124 over a network, which may be accessed by client devices through a cellular network deployed by a carrier, a WiFi network, a radio access network (RAN), other wireless networks, a wired internet protocol (IP) network, combinations thereof, or the like. The network may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where PTT systems 118 and 124 are PTT-over-Cellular (PoC) platforms, and subscribers to a PTT solution (e.g., users operating client devices) may be provisioned via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT systems 118 and 124 may provide a plurality of PTT functions to the client devices through the PTT clients.

In some embodiments, PTT systems 118 and 124 use container technology for virtualization of PTT system architecture, such as, the virtualization of provided PTT services. Example container technologies may include Docker, Rocket, LXD, and the like, although the architecture is not limited to a specific container technology. Virtualization using container technology may allow the PTT systems 118 and 124 to adopt a micro-services model in which service clusters are considered the building blocks of the system architecture. For example, each function provided by the PTT systems 118 and 124 may be virtualized in a unique service cluster, and each service cluster may perform a different function in the PTT systems 118 and 124. Service clusters may be hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT systems 118 and 124 incorporate distributed databases, clustering technologies, data analytics tools, and messaging middleware to provide a robust, scalable platform. The PTT systems 118 and 124 may use fully virtualized components with a layered approach to service orchestration, which allows the PTT systems 118 and 124 to be integrated into various cloud environments, such as a carrier's private cloud infrastructure, a dedicated PTT cloud infrastructure, combinations thereof, and the like. Other telecommunication services platforms, including other PTT platforms, may be used in other embodiments.

In some embodiments, a PTT network 100 includes a PTT NNI gateway 102 connected between a first PTT system 118 and one or more second PPT systems 124. The PTT NNI gateway 102 emulates the interfaces of the first and second PTT systems 118 and 124 using the protocol or interface used by the respective PTT system 118 and 124 communicating with the PTT NNI gateway 102. Thus, the PTT NNI gateway 102 exposes the first and second PTT systems 118 and 124 to each other and mediates or translates communications between the PTT systems 118 and 124. For example, the PTT NNI gateway 102 may be connected to a first PTT system 118 which uses an OMA protocol, and to a second PTT system 124 which uses an OMA, PoC, iDEN, P.25 CSSI/ISSI, TETRA, or DMR protocol, or the like. The PTT NNI gateway 102 receives communications such as transmissions, call set up requests, floor control messages, group management and access requests, and the like from the first and second PTT system 118 and 124 that are formatted in the protocol used by the respective PPT system 118 and 124, and translates the communications, if needed, into a second format used by another one of the PTT systems 118 and 124.

In some embodiments, the PTT NNI gateway 102 has a data management server 108 that provides interfaces to create and maintain the user identity and group identity mappings for making the users and groups of one PTT system 118 and 124 addressable in another of the PTT systems 118 and 124. The PTT NNI gateway 102 may also have a call server 110 that performs the protocol conversion necessary for bridging the PTT private calls and PTT group calls across the PTT systems 118 and 124 that are connected to the PTT NNI gateway 102. In some embodiments, the call server 110 implements one or more media codecs for transcoding that may be necessary when transmitting the PTT media bursts from one system to another. The PTT NNI gateway 102 further includes one or more interface adapters 106 and 112 that implement the protocols and procedures required to communicate with a specific PTT System. The call server 110 uses the interface adapters 106 and 112 when processing PTT calls. In some embodiments, a first interface adapter 106 is provided for the first PTT system 118, and one or more second interface adapters 112 are provided for interconnection with second PTT systems 124. For example, a service provider may provide a PTT NNI gateway 102 as an interface to the first PPT system 118 deployed in the service provider's network. Thus, the PTT NNI gateway 102 mediates between PTT systems 118 and 124 that use different communications protocols or PTT standards by modifying or replacing communications or messages from the different PTT servers 118 and 124.

Each of the PTT systems 118 and 124 has a PTT call server 120 and a PTT data management server 122. The PTT call server 120 implements the PTT call processing function within the PTT system 118 and 124. In some embodiments, the PTT call server 120 manages call functions such as call setup, terminal/handset management, floor control, packet/signal propagation, group call fan-out, and the like. Additionally, the PTT call server 120 may negotiate whether the PTT system hosting an originating or terminating party will take on the role of the PTT floor controller during the call, or negotiate whether the originating or terminating party will be the first talker during the call.

The PTT data management server 122 provides interfaces for a user or an administrator acting on behalf of a user to create PTT contact lists and PTT groups that may be used by the user. Additionally, the PTT data management server 122 may, in some embodiments, implement logic to synchronize the user identity and group identity mappings that are created in the PTT NNI gateway 102 with data in the respective PTT systems 118 and 124. For example, when a user or a group is deleted in a PTT system 118 and 124, the PTT data management server on the PTT system 118 and 124 may send a message to the data management server 108 in the PTT NNI gateway 102 to clean up the corresponding identity mappings that may have been created for the deleted user or group in the respective PTT system 118 and 124. In some embodiments, the PTT data management server 122 may also provide an interface to enable the PTT NNI gateway 102 or other peer PTT system to discover the users who are being served by the PTT system 118 and 124. Additionally, a PTT enterprise account administrator may access the PTT data management server 122 or data management server 108 to form calling group, administer users, provide rules for allowing users to communicate, or the like.

In some embodiments, the PTT NNI gateway 102 performs topology hiding as part of emulating or mediating communication between the PTT systems 118 and 124. While connecting multiple PTT systems to each other, the PTT NNI gateway 102 insulates the PTT systems 118 and 124 from each other by receiving communications such as call transmissions and group management functions intended for different PTT systems and translating or handling the communications so that the PTT systems can communicate purely using the protocols they implement. The PTT NNI gateway 102 allows various PTT systems 118 and 124 connected to it to be operated using different protocols such as, for example, different PTT technologies and different software releases. The interface between the PTT NNI gateway 102 and each PTT system 118 and 124 provides a level of abstraction allowing the PTT NNI gateway 102 to add support for additional protocols and new technologies as they develop without impacting the PTT NI gateway interface with the other PTT systems 118 and 124 that are already connected to it. Additionally, the PTT NNI gateway 102 architecture allows the PTT NNI gateway 102 and the PTT systems 118 and 124 connected to it to scale independently or be maintained, updated or managed without affecting other PTT systems 118 and 124. Therefore, it is possible to add new nodes to any of the PTT NNI gateway 102 or PTT systems 118 and 124 system transparently. Upgrades and architecture changes on any of the systems have minimal or no impact on the interfaces between the PTT NNI gateway and the PTT systems 118 and 124. Thus, it is possible to upgrade the systems independently and run each system independently, for example, on different software versions, different network systems, or the like.

The PTT NNI gateway 102, in some embodiments, provides the abstraction layer through extensions to the standards used by the PTT systems 118 and 124. For example, for a first PTT system 118 implementing the OMA/3GPP standards, the PTT NNI gateway 102 provides additional functionality beyond that required by the standard and that will allow the PTT NNI gateway 102 to be connected another or second PTT system 124 that may or may not be based on OMA/3GPP standards. The interworking may be achieved by connecting the OMA/3GPP standards based PTT system 118 to a PTT NNI gateway 102 that identifies the protocols and procedures of the PTT systems 118 and 124 connected to it and performs the necessary translation functions. Thus, the OMA/3GPP standards based PTT system 118 benefits from additional protocols and new technologies that may be supported by the PTT NNI gateway 102 without requiring any specific upgrades and enhancements on its side.

In some embodiments, the PTT NNI gateway 102 provides an abstraction layer between the different PTT system 118 and 124 by providing subscriber and group identity management, data sharing and protocol mapping, network interconnectivity, service authorization. The PTT NNI gateway 102 manages heterogeneous subscriber and group identities and addressing schemes by identifying users on an OMA/3GPP standard based PTT system by, for example, telephone number, mobile directory numbers (MDNs)/telephone universal resource identifiers (TEL URIs) or Session Initiation Protocol Uniform Resource Identifier (SIP URIs). Non-OAM standard based systems, such as non-POC systems including, but not limited to P25, iDEN, and the like, may not use MDNs to identify its subscribers, but may use different identifiers. For example, P25 systems use P25 subscriber unit identity (SU-ID) and subscriber group identity (SG-ID) as subscriber and group identities. For such systems, the PTT NNI gateway 102 creates and manages ID mappings in order to make PTT subscribers and groups in each PTT system addressable in the other PTT systems that are connected to the PTT NNI gateway 102.

In some embodiments, the PTT NNI gateway 102 also provides data sharing and protocol mapping by mapping the protocols and procedures of each PTT system to that of the other PTT systems. The PTT NNI gateway 102 handles service capability mismatch across systems and implements mechanisms to make PTT system users aware of the service capabilities of external contacts/groups.

Thus, the PTT NNI gateway 102 may mediate to requests from, for example, the second PTT system 124 for a connection to a user on the first PTT system 118 by reformatting the request into a format or standard implemented by the first PTT system 118. Likewise, the PTT NNI gateway 102 may forward or mediate call data from the first PTT system 118 to a user on the second PTT system 124. The PTT NNI gateway 102 may mediate the communications by reformatting the requests into a different format or to be complaint with particular standard, or by using a group or user alias that is stored on the PTT NNI gateway. For example, the PTT NNI gateway may replace the destination address, group ID or user ID in a communication such as a message, a packet, a PTT burst, or data received at the PTT NNI gateway 102 with a user, group or address alias stored on the PTT NNI gateway. The modified message may then be forwarded on to another PTT system 118 and 124, another PTT NNI gateway 102, or the like. Thus, for communications from a PTT system 118 and 124 that uses a first group or subscriber identity format or standard, the PTT NNI gateway may modify the communication in transit using an aliased group or subscriber ID to generate a modified communication that conforms to a second standard used by another PTT system 118 and 124.

In some embodiments, the PTT NNI gateway 102 provides network interconnectivity between the PTT systems 118 and 124. The PTT NNI gateway 102 insulates the PTT systems 118 and 124 from having to implement specific network connectivity requirements for connecting with various types of peer PTT systems 118 and 124. The PTT NNI gateway 102 maintains secure and redundant connectivity with the peer systems. In some embodiments, the PTT NNI gateway 102 does not assume availability of a dedicated link to connect with each PTT system 118 and 124 and a virtual private network (VPN) based connectivity may be used. Alternately, VPN connections may be substituted with encrypted connections/streams such as transport layer security (TLS), datagram transport layer security (DTLS), secure real-time transport protocol (SRTP), Hyper Text Transfer Protocol Secure (HTTPS), or the like between the PTT NNI gateway 102 and each of the PTT systems 118 and 124. Some peer PTT systems, such as P25 systems, require usage of VPN, and so the PTT NNI gateway 102 may implement different connection types with different PTT systems 118 and 124. In some embodiments, the PTT NNI gateway 102 implements mechanisms to manage a large number of VPN tunnels and may allow offload the VPN connectivity management from the PTT systems 118 and 124, and reduce the risk of network exposure for the PTT system 118 and 124.

In some embodiments, the PTT NNI gateway 102 provides service authorization or authentication. The service authorization may be a permission system enforcing data sharing rules and access control policies of each PTT system 118 and 124. Permission system policies may be established at system level or at a more granular subscriber level. In an embodiment, the PPT NNI gateway 102 implements an open system where, between PTT systems 118 and 124 managed by different operators, an open network relationship can be configured on the PTT NNI gateway 102 to enable the subscribers of these networks to communicate with each other. Such an open network relationship mechanism can be used to facilitate hassle free communication across PTT systems 118 and 124 deployed by partner networks.

In some embodiments, the PTT NNI gateway 102 implements a restricted system where the PTT NNI gateway 102 limits communication to between subscribers based on subscribers being explicitly allowed to communicate with subscribers served by a different PTT system 118 and 124. The restricted network system may be used to facilitate communication, for example, between users of a PTT system 118 and 124 and a land mobile radio (LMR). Such a restricted communication relationship may exist where it is necessary to have an enterprise level administrator explicitly configure the relationships in order to enable the services to be used across systems and where the communication must be restricted to only the set of users that have been enabled to do so by the administrator. Thus, the PTT NNI gateway 102 may restrict communications between a first user on the first PTT system 118 and a second user on the second PTT system 124 according to a relationship configuration or rule.

For private (1-1) calls, the OMA/3GPP PTT standards mandate that the call originator always assumes the PTT floor controller role, and that the initial PTT floor grant is always to the call originator, indicating that the call originator is always the first speaker in the call. However, other standards do not necessarily require such features, and therefore, other PTT systems may not implement the behavior mandated by the OMA/3GPP PTT standard. In order to interwork with such systems, the PTT NNI gateway 102 provides extensions or enhancements to supported standard such as, for example, the OMA/3GPP standards. In some embodiments, the PTT NNI gateway 102 negotiates whether originating party server or the terminating party server will take on the role of PTT floor controller during the call. Additionally, the PTT NNI gateway 102 may negotiate whether the originating party or the terminating party will be the first talker in the call. In other embodiments, the PTT NNI gateway 102 mediates or passes through the negotiation on PTT floor control and which user will be the first talker, permitting the PTT systems 118 and 124 to perform the negotiations.

Further, in some embodiments, when one or both of the PTT systems 118 and 124 do not provide a mechanism for negotiation of PTT floor controller role, the PTT NNI gateway 102 resolves any conflicting floor control instructions from one or both of the PTT systems 118 and 124. In some embodiments, the PTT NNI gateway 102 may determine whether first PTT system and second PTT system perform conflicting roles with respect to PTT floor control during a PTT call. For example, the first PTT system 118 may use an enhanced OMA standard and have the ability to negotiate floor control, while the second PTT system 124 may use a different standard that calls for the PTT server serving the originator of a call to take on the floor control role or for the PTT server serving the originator of a call to take on a participating server role. When such conflict is detected, the PTT NNI gateway 102 causes one of the PTT systems 118 and 124 to perform the role of a controlling PTT server and the other to perform the role of participating PTT server. The PTT NNI gateway may mediate between the different protocols and allow the second server to take on the color controlling role or participating role depending on the requirements of the second PTT system protocol or arbitrate in a single direction during negotiation of the floor controller role. Additionally, when both the originating party server and the terminating party server perform the role of participating PTT server, PTT NNI gateway 102 assumes the role of PTT floor controller during the call. Similarly, in an embodiment where both the originating party server and terminating party server perform the role of controlling PTT server, the PTT NNI gateway 102 performs protocol conversion causing one of the originating or terminating servers to appear as a participating PTT server to the other. In such an embodiment, the PTT NNI gateway may indicate that the floor is taken by the PTT system that is appearing as the participating server, which may transmit media to the other PTT server. During that time, the PTT NNI gateway 102 may discard media transmissions from other PTT servers since the PTT server appearing as participating server has precedence. The PTT NNI gateway may further determine which of the first PTT system 118 and second PTT system 124 performs the role of transmitter for the first media burst in the PTT call and perform negotiation to cause one of the PTT systems to take the role of the transmitter and the other to take the role of the receive for the first media burst in the PTT call.

For group calls, the OMA/3GPP standards dictate that the group call controller is responsible for terminating party call leg fan-out to connect all group call recipients. The call leg fan-out function indicates which network element is responsible for generating the individual signals transmitted to the respective user terminals. However, the group call controller terminating the party call leg fan-out fails to address cases that arise when a PTT group is spread across two or more PTT systems 118 and 124. Thus, when a PTT group is spread across two or more disparate PTT systems 118 and 124, it may not be possible for the group call controller to perform the terminating party call leg fan-out to connect all the participants of the group call. To facilitate group call interworking across PTT systems 118 and 124, the PTT NNI gateway 102 call functionality management enables the group call controller to delegate the fan-out responsibility for one or more subsets of the group call participants.

With respect to delegation of fan-out responsibility, it may not be possible for the PTT system 118 and 124 which is serving as the group call controller to obtain the complete group member list and perform terminating leg fan-out to connect the group members across all systems. The group call controller PTT system or the PTT NNI gateway 102 delegates the fan-out responsibility to other PTT systems, and the other PTT systems perform local fan-out to connect the group members who are being served by that system. Thus, the PTT NNI gateway may send a message to a participating server to handle terminating leg fan-out to, for example, users connected to the group call through that particular participating server. The message may be passed through from the group call controller PTT system, or may be generated by the PTT NNI gateway 102.

The PTT NNI gateway 102 may also take a participating group role. A PTT system 118 and 124 may also receive a request to perform local fan-out of terminating call legs without being the controller for that group call. A PTT system 118 and 124 performing the participating group function during a group call is relays all PTT floor control requests to the PTT system that is performing the group call controller function.

When all members of a participating group drop from the call, the participating group call session on the participating PTT system 118 and 124 may be terminated. However, when one of the members of the participating group rejoins the call, the participating PTT system 118 and 124 will restart the participating group call session and rejoin the main group call session that is in progress at the controlling PTT system 118 and 124. When rejoining a participating group call to the main group call session at the controlling PTT system, the participating PTT system 118 and 124 avoids performing the terminating leg fan-out function and connects only the local member who has requested to rejoin.

The PTT NNI gateway 102 provides handling of identification of the element responsible for performing the group leg fan-out. For example, a PTT group may include a 'LocalFan-out' attribute to indicate to the PTT system 118 and 124 whether the PTT system 118 and 124 is responsible for performing the group call leg fan-out or not. Such attribute may be set to 'false' when the group is owned by a different PTT system and the terminating leg fan-out is performed from that system or by the PTT NNI gateway 102.

The PTT group may also have an 'IsFocus' attribute indicate to the PTT system 118 and 124 whether it is responsible for performing the group call controller role. This attribute may be set to 'false' if the group call control is performed by a different PTT system or the PTT NNI GW System, and set to 'true' if the PTT system is intended to be the group call controller. Thus, in some embodiments, the PTT NNI gateway 102 may determine which PTT system will hold the call controller role, or whether the PTT NNI gateway 102 will act as the call controller.

The PTT NNI gateway 102 may also provide a user discovery interface allowing the PTT NNI gateway 102 and PTT systems 118 and 124 to discover whether a given user is being served by a PTT system 118 and 124 connected through the PTT NNI gateway 102. The user discovery interface, in some embodiments, is an open interface permitting queries through the PTT NNI gateway 102 regarding user identities. The PTT NNI gateway 102 responds with a confirmation message or denial message indicating whether the user is registered with, or served by the PTT NNI gateway networked systems.

In an OMA/3GPP standards based PTT system, the native address format for the user identities is a TEL URI or SIP URI, of which the user's phone number may or may not be a part. Other PTT system standards or format may use different user identity formats. The PTT NNI gateway 102 provides functionality allowing systems using OMA/3GPP standards to address external entities using a known native address format and map these addresses to their actual external identity.

For PTT system users who needs to be communicate with PTT users served by one or more other PTT systems, the PTT NNI GW creates a unique alias identity corresponding to each peer PTT system with which the user needs to communicate. These aliases are addressable within the respective PTT systems 118 and 124 and the PTT NNI gateway 102 maps the alias identity back to the original user identity. Thus, the PTT NNI gateway may, in some embodiments, reserve user identities or group identities and associate a user or a group with the identity. The PTT NNI gateway 102 then modifies a communication transmitted by one of the PTT systems according to the association of the identity.

In some embodiments, the PTT NNI gateway 102 or PTT system 118 and 124 reserves one or more pools of user identities, in which each user identity in the pool is referred to henceforth as ExtSubscrID. An ExtSubscrID may be associated with a user being served by a different PTT system. In various embodiments, this ExtSusbcrID association function may be performed by the PTT NNI gateway 102, by the peer PTT system 118 and 124 or by both the PTT NNI gateway 102 and one or more of the PTT systems 118 and 124.

For external group identities, the PTT NNI gateway 102 or PTT system 118 and 124 also reserves one or more pools of group identities, in which each group identity in the pool is referred to as ExtGrpID. An ExtGrpID may be associated with a group being served by a different PTT system. This ExtGrpID association function may be performed PTT NNI gateway 102, by the peer PTT system 118 and 124 or by both the PTT NNI gateway 102 and one or more of the PTT systems 118 and 124. The ExtGrpID may be linked to a PTT group that is created locally within the system. Thus, a PTT group call and other PTT service related activity on either side of this association can be connected using the association between the ExtGrpId and the group identified locally or privately on the PTT system 118 and 124 or PTT NNI gateway 102 group.

When handling private PTT calls, PTT call alerts, and when passing talker/floor control identification information during PTT group call sessions, the PTT NNI gateway 102 presents an alias identity for the user according to the protocol supported by the receiving PTT system. Thus, when handling communications, the PTT NNI gateway 102 modifies the communication by replacing the user identifier or alias with the corresponding alias or user identifier.

For group calls, the PTT NNI gateway 102 manages PTT group calls spanning across multiple PTT systems 118 and 124 that are connected to the PTT NNI gateway 102. FIG.

2 is a logical diagram illustrating management by the PTT NNI gateway 102 of PTT groups having users on remote PTT systems 124 according to some embodiments. A PTT system 118 and 124 such as a first or local PTT system 118 may permit external users who belong to external, or second, PTT systems 124 to be added as members to a local PTT group 214 on the first PTT system 118. The originating, or first PTT system 118 receives an initial call request and a group call leg 210 is generated between the originating user 202 and the originating, or first, PTT system 118. The group call is limited to a local PTT group 214 on the originating, or first PTT system 118. The first PTT system 118 having the local PTT group 214 performs the controlling PTT server role and fans out the external calls legs 208 corresponding to the external subscribers 202 to the second PTT system 124 via PTT NNI gateway 102. The PTT NNI gateway 102 relays each of the external call legs 208 to the respective external PTT System 124 that is serving the external PTT users 206. Thus, the PTT NNI gateway 102 and the terminating or second PTT systems 124 handle each call leg 212 and 208 independently as a participating PTT call leg, in which the PTT floor control requests are relayed all the way back to the originating, first PTT system 118. Additionally, the originating, or first PTT system 118 handles fan-out of internal call legs 212 to internal PTT users 204. Thus, in some embodiments, the PTT NNI gateway 102 may mediate the addressing of external call legs 208 that are created between the external, or second PTT systems 124 and the originating, or first, PTT system 118 by modifying the group ID or user ID identified in the external call legs, replacing the group ID or user ID used by the external PTT systems 124 with an internal identifier used within the local PTT group 214 of aliased by the PTT NNI gateway.

In some embodiments, where the originating PTT system 118 and the terminating remote, or second, PTT systems 124 do not recognize each other's PTT group addressing scheme or do not implement a common group addressing scheme, and do not have the capability to handling the routing for each other's PTT group addresses. On a private call, the PTT NNI gateway 102 may forwards the terminating or external legs to the second PTT system 124 according to the private (1-1) PTT call protocol implemented by that PTT system. Thus, the PTT NNI gateway 102 determines whether the first PTT system 189 and second PTT system 124 can implement the group addressing scheme uses by the other PTT server 118 and 124, and if not, the PTT NNI gateway 102 emulates a one-to-one (1-1) call by providing the terminating call legs using the one-to-one (1-1) private call protocol of the respective PTT server.

Additionally, the PTT NNI gateway 102 may monitor the format of communications used by the PTT system 118 and 124 to determine a suitable communication format for each of the PTT systems 118 and 124, and may use that determination to modify of mediate communications to and from the respective PTT system 118 and 124. In a private or one-to-one call the PTT NNI gateway may use a private call protocol implemented by the respective PTT system 118 and 124. Thus, the PTT NNI gateway 102 may provide, in response to determining that a first one the first PTT system and second PTT system do not implement a common group addressing scheme, terminating call legs to the first PTT system and second PTT system using a respective one-to-one private call protocol implemented by PTT systems 118 and 124.

Figure 3:
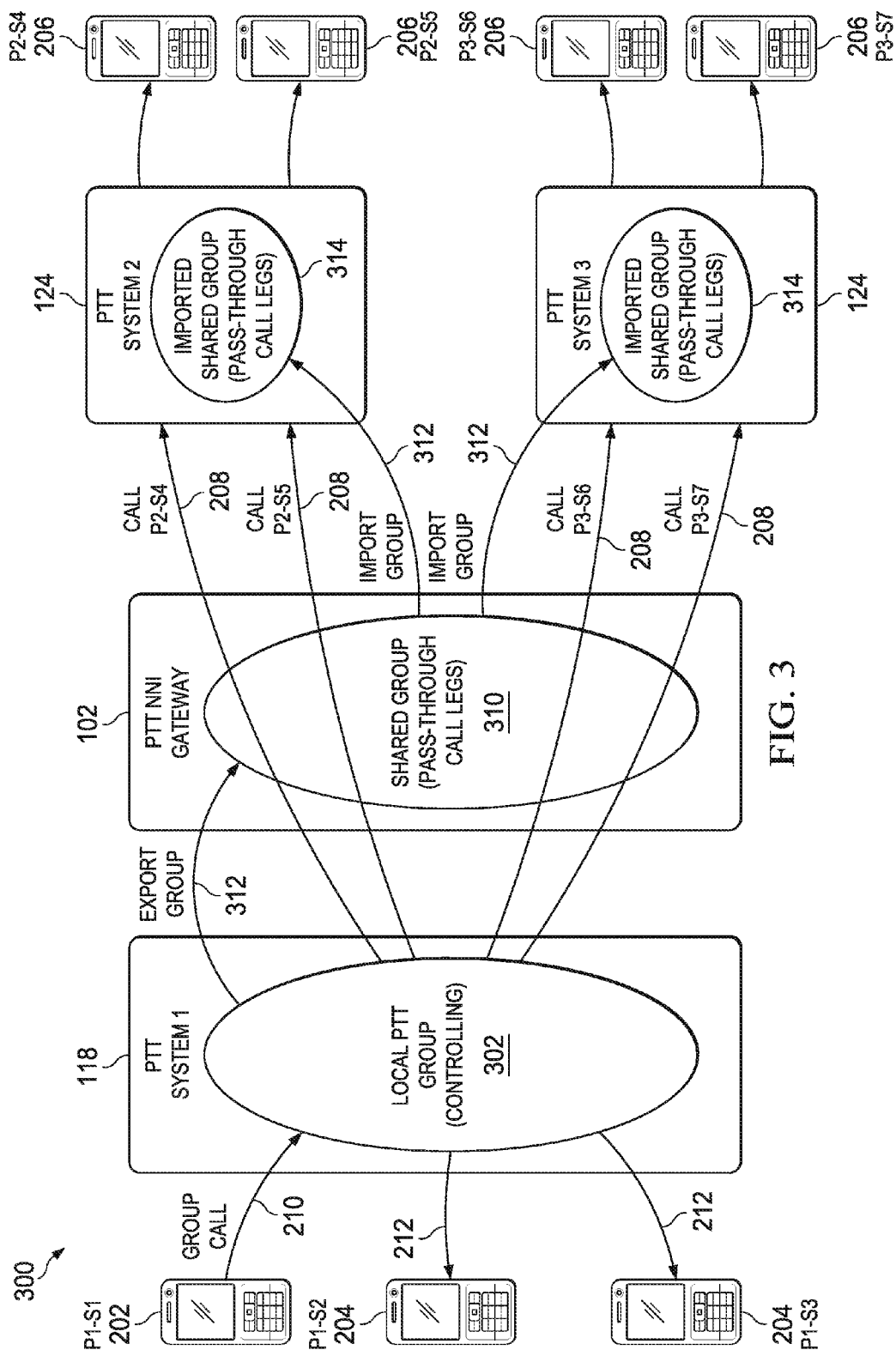
FIG. 3 is a logical diagram illustrating call flow with a PTT NNI gateway when a PTT user belonging to the group home, or controlling, PTT system originates the group call according to some embodiments.

FIG. 3 is a logical diagram illustrating call flow with a PTT NNI gateway 102 when a PTT user belonging to the home, or controlling, PTT system 118 originates the group call according to some embodiments. When users on different PTT systems 118 and 124 enter into a shared POC group call, the PTT systems 118 and 124 need access to the information of the external users so that the controlling PTT system 118 and 124 can include the external users in a local PTT group 302. In order to make a local PTT group 302 visible to external subscriber members 206 of that group, the local PTT group 302 may, in some embodiments, be exported to the PTT NNI gateway 102 by way of a group export 312, to form a shared group 310 at the PTT NNI gateway 102. The shared group 310/local group 302 is imported into a peer PTT system 124 by way of a group import 312. The imported shared group 314 can then be locally advertised by the external PTT systems 124 to PTT subscribers 206. In some embodiments, all users 206 to whom the group is advertised are present in the original exported PTT group 302. When an administrator makes changes to the PTT group 302 at a later time, PTT NNI gateway 102 propagates these changes to the PTT systems 124 into which the group has been imported. In some embodiments, when an exported PTT group 302 is imported into a PTT system 124 as an external group 314 in the manner described above, local fan-out of external call legs 208 is disabled in such imported groups 314.

The call model for a shared POC group is similar to the local unshared PTT group call model. During a group call, the group local PTT call server of the local PTT system 118 serves as controlling PTT server and will fan out all participant call legs 212 and 208. The call legs 208 corresponding to external users 206 are routed through PTT NNI gateway 102 to the respective home PTT system 124 of the external user 206. The external, or peer, PTT system 124 into which the group is imported merely performs the role of participating PTT server for each external call leg 208 passing through it. In case of a shared group call, the participants of the call will be able to call back to the group or initiate a new call to the group at a later time as the group information is advertised to all the participants.

Thus, a PTT NNI gateway 102 may be network-to-network interface NNI device, having at least one PTT interface adapter, a processor connected to the at least one PTT interface adapter and a non-transitory computer readable medium connected to the processor and having stored thereon instructions that, when executed by the processor, cause the NNI device to perform the described functions, methods and processes. The PTT NNI gateway 102 may receive a first PTT communication in a first PTT format through the at least one PTT interface adapter from a first PTT system 118 and translate the first PTT communication into a second PTT communication in one or more second PTT formats. The PTT NNI gateway 102 transmits the second PTT communication, in one or more second formats, through the at least one PTT interface adapter to one or more second PTT systems. The PTT NNI gateway 102 emulates an interface of one or more second PTT systems 124 to the first PTT system 118, and emulates an interface of the first PTT system 118 to the one or more second PTT systems 124. The PTT NNI gateway 102 transmits, or passes through, call leg communications from a PTT system 118 and 124 acting as a controlling PTT server to another PTT system 118 and 124 acting as a participating PTT server. Additionally, the PTT NNI gateway 102 may transmit, or pass through, a floor control request or an originating call leg communication from the PTT system 118 and 124 acting as a participating PTT server to another PTT system that is acting as a controlling PTT server. The transmitting or passing through may include modifying the communication format of the communication into a format used by the receiving PTT system.

Figure 4:
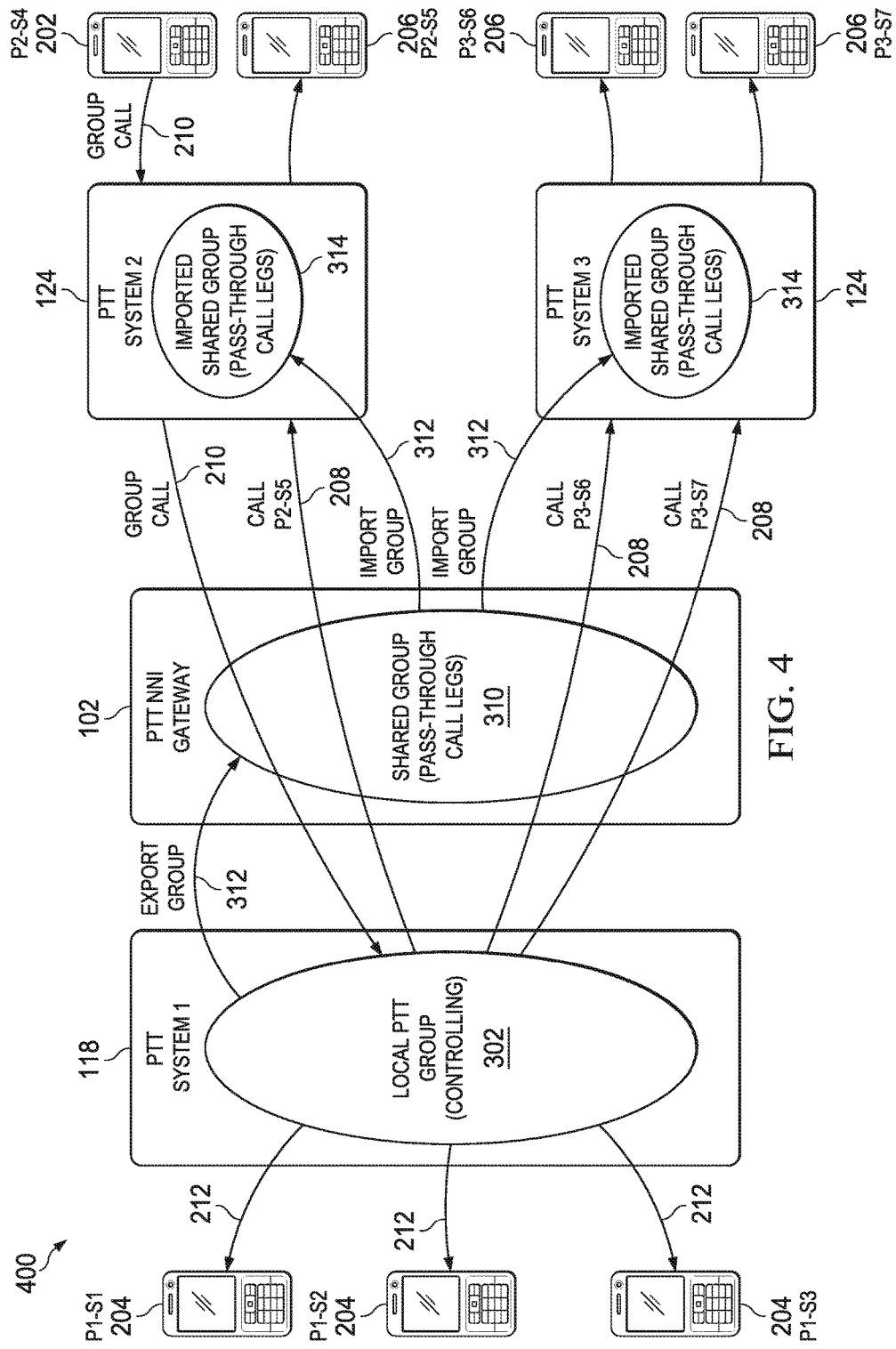
FIG. 4 is a logical diagram illustrating call flow with a PTT NNI gateway when a PTT user belonging to external PTT system originates the group call according to some embodiments.

FIG. 4 is a logical diagram illustrating call flow with a PTT NNI gateway 102 when a PTT user belonging to external PTT system 124 originates the group call according to some embodiments. When an external user 202 belonging to an external peer PTT system 124 originates the call, the originating call leg 210 is relayed by the PTT NNI gateway 102 to the group home, or local, PTT system 118, and the group home PTT system fans out the call legs 208 and 212 to all the group members 204 and 206.

In such an embodiment, the local group 302 is exported by way of a group export 312 to the PTT NNI gateway 102 where it is maintained as a shared group 310. The shared group 310 is then imported by way of a group import 312 to each of the external PTT systems 124. Thus, each of the external PTT system 124 has an imported shared group 314 indicating all of the users associated with the local PTT group 302, permitting the external PTT systems 124 to advertise the users of the local PTT group 302/imported shared group 314 to external users 206.

Thus, a PTT system 118 and 124 may, in some embodiments, be a hardware system running software for performing the described methods and procedures. An embodiment PTT system or device may have a communications interface, a processor connected to the communications interface and a non-transitory computer readable medium connected to the processor and having stored thereon instructions that, when executed by the processor, cause the PTT system 118 and 124 to perform the methods and procedures. The PTT system 118 and 124 may synchronize a user identity mapping or a group identity mapping with a NNI device such as a PTT NNI gateway 102. The PTT system 118 and 124 may export a group for use in a shared group at the PTT NNI gateway 102 and for import by a second PTT system 118 and 124 from the PTT NNI gateway 102 for management of users and groups. The PTT system 118 and 124 may communicate with another PTT system by generating a first PTT communication message in a first PTT format. The first PTT message may have data related to a call between a first user on the PTT system 118 and 124 and a second user on one or more other PTT systems, which communicates in one or more second PTT formats. The PTT system 118 and 124 may transmit the first PTT communication message to the PTT NNI gateway 102, and through the PTT NNI gateway 102 to the one or more other PTT systems. The PTT systems 118 and 124 may also negotiate, with the PTT NNI gateway 102 or the other PTT systems 118 and 124 which PTT system 118 and 124 will take on a role of a PTT floor controller during the call and whether the first user of the second user will be a first talker on the call. In some embodiments, the PTT system 118 and 124 may delegate terminating leg fan-out for a call to the other PTT system 118 and 124. The PTT system 118 and 124 may act in a participating group role in response by receiving a request to perform terminating leg fan out and relay PTT floor control requests to the second PTT system. The request to perform terminating leg fan out is a value set in an attribute in a PTT group participating in the call. In some embodiments, the PTT system may act as a group call controller according to a value set in an attribute in a PTT group participating in the call.

Figure 5:
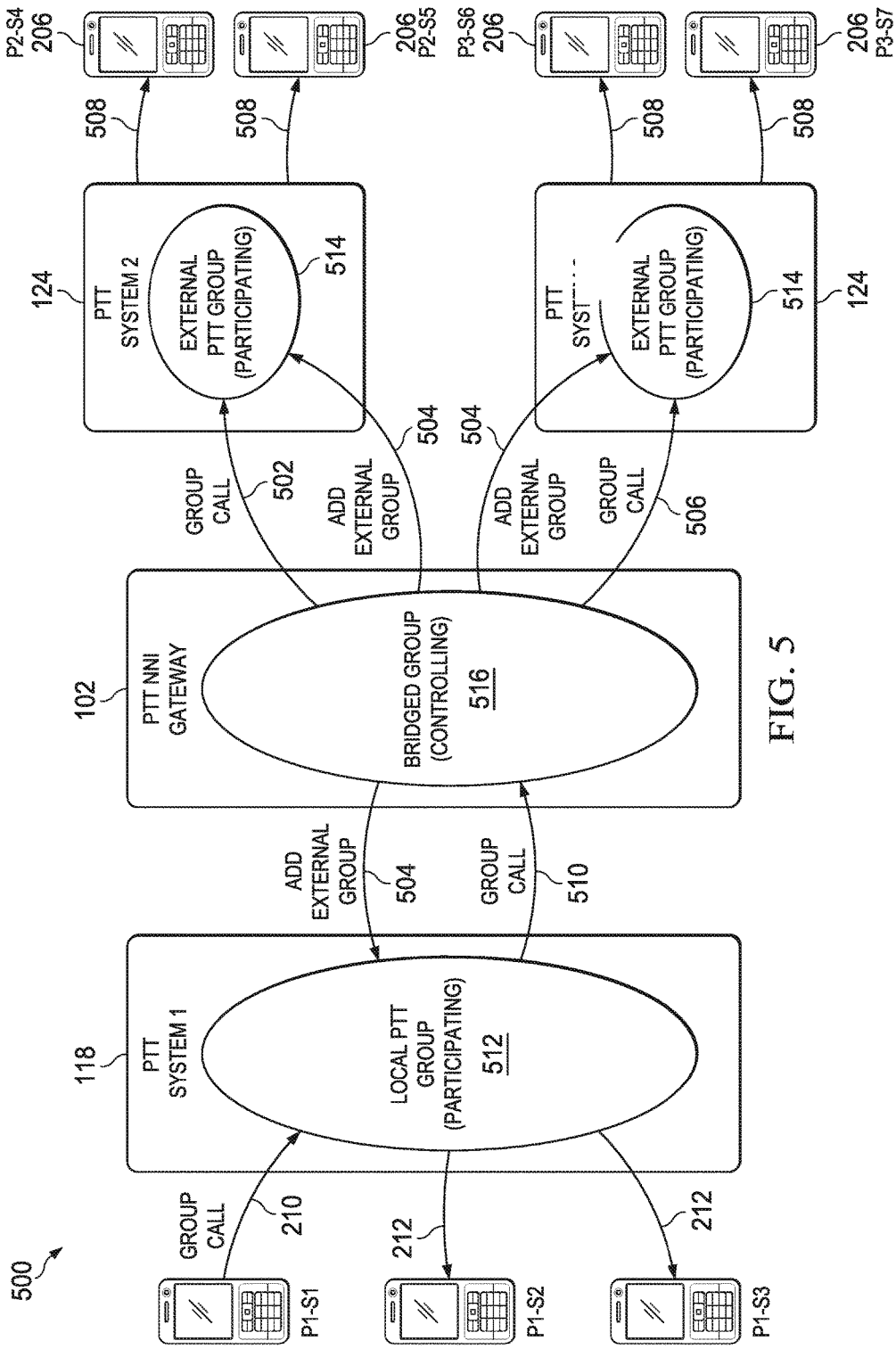
FIG. 5 is a logical diagram illustrating call flow with a PTT NNI gateway 102 for a bridged call group according to some embodiments.

FIG. 5 is a logical diagram illustrating call flow with a PTT NNI gateway 102 for a bridged call group according to some embodiments. In a bridged group, the shared group 516 is created in the PTT NNI gateway and linked to a specific PTT group 512 and 514 in each PTT system 118 and 124, where each of these linked groups 512 and 514 is administered independently in the respective PTT system 118 and 124. The bridged group 516 is, thus, a group of groups from PTT systems 118 and 124 that are connected to the PTT NNI gateway 102.

In an embodiment, during a group call, the PTT NNI gateway 102 performs the controlling function and all the PTT systems 118 and 124 hosting the sub-groups will perform a participating role. Each PTT system 118 and 124 perform local fan-out of call legs 212 and 508 to the members of their respective groups but floor control is managed centrally by the PTT NNI gateway 102.

Thus, the NNI gateway 102 may receive an exported group from the first PTT system 118, where the exported group has data related to users on the first PTT system 118, and may transmit an import group to the second PTT system 124 for local advertising to users on the second PTT system 124. The import group has information regarding each of the first users from the first PTT system 118, and may be in a format usable by the second PTT system 124. The PTT NNI gateway 102 propagates changes in the exported group to the second PTT system in response to changes being made in the exported group, for example, users being removed form a particular group by a network administrator. The PTT NNI gateway 102 creates a bridged user group from at least a portion of a first user group on the first PTT system 118 and a second user group on the second PTT system 124 and acts as a controlling server for a group PTT call between a user in the first group on the first PTT system 118 and a user in the second group on the second PTT system 124. When acting as a controlling server for a group PTT call or bridged call, the PTT NNI gateway 102 may receive a floor control request from a user on the first or second PTT systems 118 and 124 and determine whether the user is granted floor control. Additionally, the PTT NNI gateway may delegate fan-out to the PTT systems 118 and 124 by transmitting group call communications to the first PTT system 118 and the second PTT system 124 instructing the first PTT system and the second PTT system perform fan-out to respective users.

In order to participate in a bridged group call session, the participating PTT systems 118 and 124 support the following functions of participating in a group role and rejoining a bridged group. While the group home POC server is usually considered the controlling PTT system, in the case of PTT NNI bridged group calls, the PTT systems 118 and 124 take a participating role so that it relays all floor control requests to the PTT NNI gateway 102.

Additionally, when all participants of a sub-group for a particular PTT system 118 and 124 drop from the call, the sub-group call session on the PTT system 118 and 124 may be terminated since no participants in the call exist on the respective PTT system 118 and 124. When one of the participants rejoins the call, PTT system 118 and 124 restarts the sub-group session and rejoins the sub-group to the bridged group call session that is progress in the PTT NNI gateway 102. When rejoining a sub-group to the bridged group on PTT NNI gateway 102, the PTT system 118 and 124 avoids fan-out and connects only the member local to the PTT system 118 and 124 that who has requested to rejoin. In such an instance, fan-out is avoided since only a single member of the group from the respective PTT system 118 and 124 has rejoined the group call. Additionally, when hosting users participating in a group call across multiple PTT systems, the PTT system 118 and 124 may terminate a participating group call session in response to all users on the PTT system in a participating group on the PTT system drop from the call. Terminating the participating group call session may include disconnecting or terminating the call legs to the group call controller. However, the PTT system 118 and 124 may also restart the participating group call session and rejoin the call in response to at least one user in the participating group rejoining the call. Thus, when a user on the first PTT system 118 is the last caller from the first PTT system 118 on a group call with users from the second PTT system 124, when the user on the first PTT system disconnects or drops from the call, the first PTT system 118 may disconnect the participating group from the call, and when a user on the first PTT system 118 joins or rejoins a call on the PTT NI Gateway 102 or second PTT system 124, the first PTT system will reform the participating call group and reconnect or rejoin the participating call group to the call.

Figure 6:
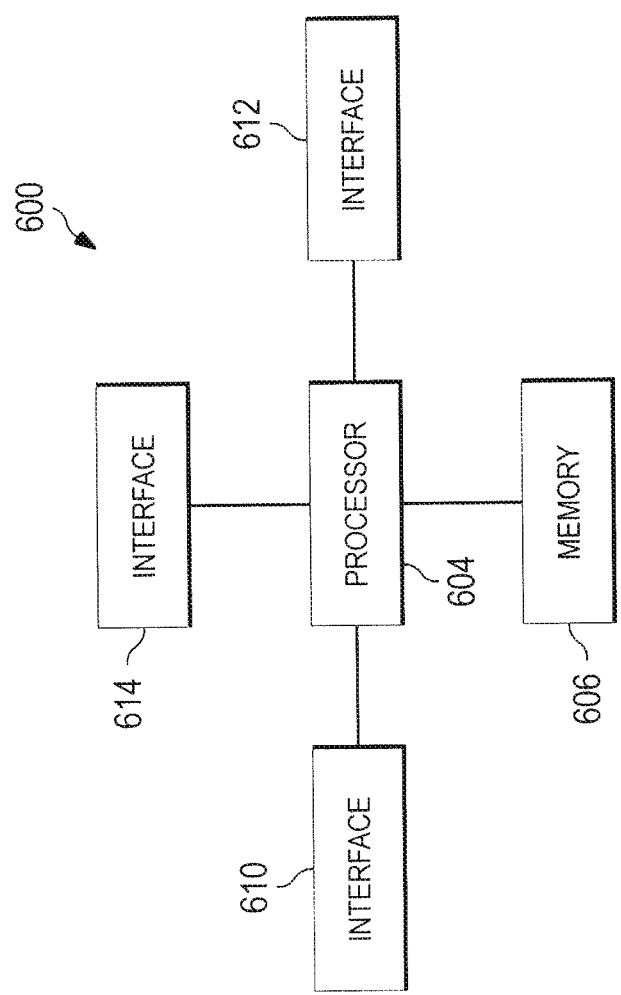
FIG. 6 illustrates a block diagram of an embodiment processing system for performing methods described herein, and that can be used to implement various embodiments.

FIG. 6 illustrates a block diagram of an embodiment processing system 600 for performing methods described herein, which may be installed in a host device such as a PTT system, PTT NNI gateway, or component thereof. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
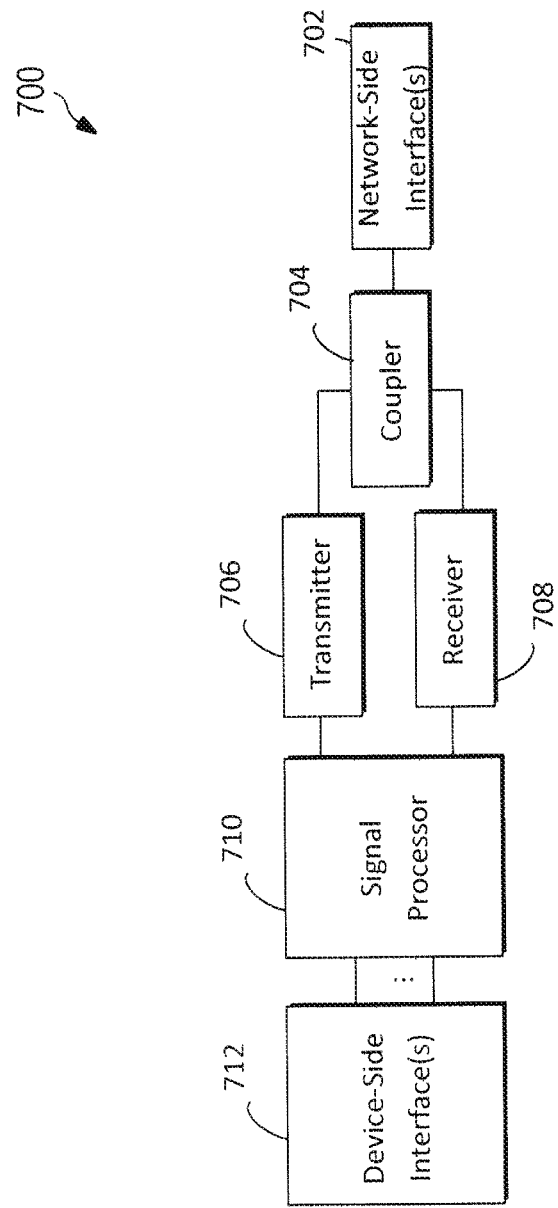
FIG. 7 illustrates a block diagram of a transceiver 700 adapted to transmit and receive signaling over a telecommunications network according to some embodiments.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

An embodiment network-to-network interface (NNI) device, including at least one push-to-talk (PTT) interface adapter, a processor connected to the at least one PTT interface adapter, and a non-transitory computer readable medium connected to the processor. The non-transitory computer readable medium has stored thereon instructions that, when executed by the processor, cause the NNI device to receive a first PTT communication in a first PTT format through the at least one PTT interface adapter from a first PTT system, translate the first PTT communication into a second PTT communication in one or more second PTT formats, and transmit the second PTT communication through the at least one PTT interface adapter to one or more second PTT systems. In some embodiments, the non-transitory computer readable medium further has stored thereon instructions that, when executed by the processor, cause the NNI device to emulate an interface of the one or more second PTT systems to the first PTT system, and emulate an interface of the first PTT system to the one or more second PTT systems. In some embodiments, the non-transitory computer readable medium further has stored thereon instructions that, when executed by the processor, cause the NNI device to pass through call leg communications from one of the first PTT system and the one or more second PTT systems acting as a controlling PTT server to another of the first PTT system and second PTT system acting as a participating PTT server. In some embodiments, the non-transitory computer readable medium further has stored thereon instructions that, when executed by the processor, cause the NNI device to determine whether a conflict exists between the first PTT system and the one or more second PTT systems in roles performed with respect to PTT floor control during a PTT call, and instruct one of the first PTT system and the one or more second PTT systems to perform a role of controlling PTT server and the other to perform a role of participating PTT server in response to determining that the conflict exists. In some embodiments, the non-transitory computer readable medium further has stored thereon instructions that, when executed by the processor, cause the NNI device to resolve conflicting floor control instructions from one or more systems of the first PTT system and the one or more second PTT systems in response to the respective one or more systems not providing a mechanism for negotiation of PTT floor controller role. In some embodiments, the non-transitory computer readable medium further has stored thereon instructions that, when executed by the processor, cause the NNI device to assume a role of PTT floor controller during the PTT call when both a server of an originating party and a server of a terminating party perform the role of participating PTT server. In some embodiments, the non-transitory computer readable medium further has stored thereon instructions that, when executed by the processor, cause the NNI device to perform, in response to both an originating party server and a terminating party server having a role of controlling PTT server, protocol conversion on communications between the originating party server and the terminating party server, the protocol conversion including information indicating that a first server of the originating party server or the terminating party server is a participating PTT server to a second server of the originating party server or the terminating party server. In some embodiments, the non-transitory computer readable medium further has stored thereon instructions that, when executed by the processor, cause the NNI device to determine which of the first PTT system and the one or more second PTT systems performs a role of transmitter for a first media burst in a PTT call, perform negotiation to cause a first system of the first PTT system and the one or more second PTT systems to take the role of transmitter and further to cause a second system of the first PTT system and the one or more second PTT systems to take a role of receiver for the first media burst in the PTT call. In some embodiments, the non-transitory computer readable medium further has stored thereon instructions that, when executed by the processor, cause the NNI device to provide, in response to determining that a first one the first PTT system and at least one of the one or more second PTT systems do not implement a common group addressing scheme, terminating call legs to the first PTT system and second PTT system using a respective one-to-one private call protocol implemented by the respective one of first PTT system and one or more second PTT systems. In some embodiments, the non-transitory computer readable medium further has stored thereon instructions that, when executed by the processor, cause the NNI device to receive an exported group from the first PTT system, the exported group including first users, and transmit an import group to at least one of the one or more second PTT systems for local advertising to users on the at least one of the one or more second PTT systems, the import group having information regarding each of the first users. In some embodiments, the non-transitory computer readable medium further has stored thereon instructions that, when executed by the processor, cause the NNI device to propagate changes in the exported group to the at least one of the one or more second PTT systems in response to changes being made in the exported group. In some embodiments, the non-transitory computer readable medium further has stored thereon instructions that, when executed by the processor, cause the NNI device to create a bridged user group from at least a portion of a first user group on the first PTT system and one or more second user groups on the one or more second PTT systems, and act as a controlling server for a group PTT call between at least one user in the first group on the first PTT system and at least one user in the one or more second user groups on the one or more second PTT systems. In some embodiments, the non-transitory computer readable medium further has stored thereon instructions that, when executed by the processor, cause the NNI device to receive a floor control request from a user, and determine whether the user is granted floor control. In some embodiments, the non-transitory computer readable medium further has stored thereon instructions that, when executed by the processor, cause the NNI device to transmit group call communications to the first PTT system and the one or more second PTT systems instructing the first PTT system and the one or more second PTT systems to perform fan-out to respective users. In some embodiments, the non-transitory computer readable medium further has stored thereon instructions that, when executed by the processor, cause the NNI device to reserve at least one user identity that is routable and addressable on a first system selected from the first PTT system and the one or more second PTT systems, associate, with the at least one user identity, a first user on a second system selected from the first PTT system and the one or more second PTT systems, and modify a communication transmitted by the second system to a second user according to the association of the user identity. In some embodiments, the non-transitory computer readable medium further has stored thereon instructions that, when executed by the processor, cause the NNI device to reserve at least one group identity that is routable and addressable on a first system selected from the first PTT system and the one or more second PTT systems, associate, with the at least one group identity, a group on a second system selected from the first PTT system and the one or more second PTT systems, and modify a communication transmitted by the second system to a user according to the association of the group identity. In some embodiments, the non-transitory computer readable medium further has stored thereon instructions that, when executed by the processor, cause the NNI device to restrict communications between a first user on the first PTT system and a second user on the one or more second PTT systems according to a relationship configuration.

An embodiment method includes receiving a first push-to-talk (PTT) communication in a first PTT format at a network-to-network interface (NNI) device from a first PTT system, translating the first PTT communication into a second PTT communication in at least one second PTT format, and transmitting the second PTT communication by the NNI device to at least one second PTT system. In some embodiments, the method further includes emulating an interface of the at least one second PTT system to the first PTT system, and emulating an interface of the first PTT system to the at least one second PTT system. In some embodiments, the method further includes passing through call leg communications from one of the first PTT system and the at least one second PTT system acting as a controlling PTT server to another of the first PTT system and the at least one second PTT system acting as a participating PTT server. In some embodiments, the method further includes determining whether a conflict exists between the first PTT system and at least one second PTT system in roles performed respect to PTT floor control during a PTT call, and instructing one of the first PTT system and the at least one second PTT system to perform a role of controlling PTT server and the other to perform a role of participating PTT server in response to determining that the conflict exists. In some embodiments, the method further includes resolving conflicting floor control instructions from one or more systems of the first PTT system and the at least one second PTT system in response to the respective one or more systems not providing a mechanism for negotiation of PTT floor controller role. In some embodiments, the method further includes assuming a role of PTT floor controller during the PTT call when both a server of an originating party and a server of a terminating party perform the role of participating PTT server. In some embodiments, the method further includes performing, in response to both an originating party server and a terminating party server having a role of controlling PTT server, protocol conversion on communications between the originating party server and the terminating party server, the protocol conversion including information indicating that a first server of the originating party server or the terminating party server is a participating PTT server to a second server of the originating party server or the terminating party server. In some embodiments, the method further includes determining which of the first PTT system and the at least one second PTT system performs a role of transmitter for a first media burst in a PTT call, and performing negotiation to cause a first system of the first PTT system and the at least one second PTT system to take the role of transmitter and further to cause a second system of the first PTT system and the at least one second PTT system to take a role of receiver for the first media burst in the PTT call. In some embodiments, the method further includes providing, in response to determining that the first PTT system and the at least one second PTT system do not implement a common group addressing scheme, a terminating call leg to one of the first PTT system and the at least one second PTT system using a one-to-one private call protocol implemented by the respective one of the first PTT system and the at least one second PTT system. In some embodiments, the method further includes receiving an exported group from the first PTT system, the exported group comprising first users, and transmitting an import group to the at least one second PTT system for local advertising to users on the at least one second PTT system, the import group having information regarding each of the first users. In some embodiments, the method further includes propagating changes in the exported group to the at least one second PTT system in response to changes being made in the exported group. In some embodiments, the method further includes creating, by the NNI device, a bridged user group from at least a portion of a first user group on the first PTT system and at least one second user group on the at least one second PTT system, and acting, by the NNI device, as a controlling server for a group PTT call between at least one user in the first group on the first PTT system and at least one user in the at least one second group on the at least one second PTT system. In some embodiments, acting as the controlling server for the group PTT call may include receiving a floor control request from a user, and determining whether the user is granted floor control. In some embodiments, acting as the controlling server for the group PTT call includes transmitting, from the NNI device, group call communications to the first PTT system and the at least one second PTT system for fan-out by the first PTT system and the at least one second PTT system to respective users. In some embodiments, the method further includes reserving at least one user identity that is routable and addressable on a first system selected from the first PTT system and the at least one second PTT system, associating, with the at least one user identity, a first user on a second system selected from the first PTT system and the one or more second PTT systems, and modifying a communication transmitted by the second system to a second user according to the association of the user identity. In some embodiments, the method further includes reserving at least one group identity selected from group identities that are routable and addressable on a first system selected from the first PTT system and the at least one second PTT system, associating, with the at least one group identity, a group on a second system selected from the first PTT system and the one or more second PTT systems, and modifying a communication transmitted by the second system to a user according to the association of the group identity. In some embodiments, the method further includes restricting communications between a first user on the first PTT system and a second user on the second PTT system according to a relationship configuration.

An embodiment push-to-talk (PTT) device includes a communications interface, a processor connected to the communications interface, and a non-transitory computer readable medium connected to the processor. The non-transitory computer readable medium has stored thereon instructions that, when executed by the processor, cause the PTT device to synchronize one of a user identity mapping and a group identity mapping with a network-to-network interface (NNI) device, generate a first PTT communication message in a first PTT format, the first PTT message having data related to a call between a first user on the PTT device and a second user on a second PTT device that communicates in a second PTT format, and transmit the first PTT communication message to a network-to-network interface (NNI) device and through the NNI device to a second PTT device. In some embodiments, the non-transitory computer readable medium further has stored thereon instructions that, when executed by the processor, cause the PTT device to negotiate whether PTT device or the second PTT device will take on a role of a PTT floor controller during the call, and negotiate whether the first user of the second user will be a first talker on the call. In some embodiments, the non-transitory computer readable medium further has stored thereon instructions that, when executed by the processor, cause the PTT device to delegate terminating leg fan-out for the call to the second PTT device. In some embodiments, the non-transitory computer readable medium further has stored thereon instructions that, when executed by the processor, cause the PTT device to act in a participating group role in response by receiving a request to perform terminating leg fan out and relay PTT floor control requests to the second PTT device. In some embodiments, a request to perform terminating leg fan out is a value set in an attribute in a PTT group participating in the call. In some embodiments, the non-transitory computer readable medium further has stored thereon instructions that, when executed by the processor, cause the PTT device to act as a group call controller according to a value set in an attribute in a PTT group participating in the call. In some embodiments, the non-transitory computer readable medium further has stored thereon instructions that, when executed by the processor, cause the PTT device to terminate a participating group call session in response to all users on the PTT device in a participating group on the PTT device drop from the call, and restart the participating group call session and rejoin the call in response to at least one user in the participating group rejoining the call.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A network-to-network interface (NNI) device, comprising:
   at least one push-to-talk (PTT) interface adapter;
   a processor connected to the at least one PTT interface adapter;
   a non-transitory computer readable medium connected to the processor and having stored thereon instructions that, when executed by the processor, cause the NNI device to:
   receive a first PTT communication in a first PTT format through the at least one PTT interface adapter from a first PTT system;
   translate the first PTT communication into a second PTT communication in one or more second PTT formats;
   transmit the second PTT communication through the at least one PTT interface adapter to one or more second PTT systems;
   determine whether a conflict exists between the first PTT system and the one or more second PTT systems in roles performed with respect to PTT floor control during a PTT call, wherein the conflict exists when the first PTT system and the one or more second PTT systems apply a different standard for whether a PTT server serving a call originator of the PTT call takes on a role of a controlling PTT server or a participating PTT server;
   in response to determining the conflict exists for the PTT call, select a first one of the first PTT system and the one or more second PTT systems to perform a role of the controlling PTT server in accordance with system protocol requirements of the first PTT system or the one or more second PTT systems, wherein selecting the first one of the first PTT system and the one or more second PTT systems to perform the role of the controlling PTT server comprises selecting a PTT system of the call originator of the PTT call to perform the role of the controlling PTT server; and
   instruct the first one of the first PTT system and the one or more second PTT systems to perform the role of the controlling PTT server during the PTT call and the other one of the first PTT system and the one or more second PTT systems to perform a role of the participating PTT server during the PTT call in response to selecting the first one of the first PTT system and the one or more second PTT systems to perform the role of the controlling PTT server.

2. The NNI device of claim 1, wherein the non-transitory computer readable medium further has stored thereon instructions that, when executed by the processor, cause the NNI device to:
   emulate an interface of the one or more second PTT systems to the first PTT system; and
   emulate an interface of the first PTT system to the one or more second PTT systems.

3. The NNI device of claim 1, wherein the non-transitory computer readable medium further has stored thereon instructions that, when executed by the processor, cause the NNI device to:
   after instructing the first one of the first PTT system and the one or more second PTT systems to perform the role of the controlling PTT server and the other one of the first PTT system and the one or more second PTT systems to perform the role of the participating PTT server, pass through a floor control request from the first one of the first PTT system and the one or more second PTT systems acting as the controlling PTT server to the other one of the first PTT system and second PTT system acting as the participating PTT server.

4. The NNI device of claim 3, wherein the non-transitory computer readable medium further has stored thereon instructions that, when executed by the processor, cause the NNI device to:
   determine which of the first PTT system and the one or more second PTT systems performs a role of transmitter for a first media burst in a PTT call; and
   perform negotiation to cause a first system of the first PTT system and the one or more second PTT systems to take the role of transmitter and further to cause a second system of the first PTT system and the one or more second PTT systems to take a role of receiver for the first media burst in the PTT call.

5. The NNI device of claim 3, wherein the non-transitory computer readable medium further has stored thereon instructions that, when executed by the processor, cause the NNI device to:
   provide, in response to determining that a first one the first PTT system and at least one of the one or more second PTT systems do not implement a common group addressing scheme, terminating call legs to the first PTT system and second PTT system using a respective one-to-one private call protocol implemented by the respective one of first PTT system and one or more second PTT systems.

6. The NNI device of claim 1, wherein the non-transitory computer readable medium further has stored thereon instructions that, when executed by the processor, cause the NNI device to:
   resolve conflicting floor control instructions from one or more systems of the first PTT system and the one or more second PTT systems in response to the respective one or more systems not providing a mechanism for negotiation of PTT floor controller role.

7. The NNI device of claim 1, wherein the non-transitory computer readable medium further has stored thereon instructions that, when executed by the processor, cause the NNI device to:
   assume a role of PTT floor controller during the PTT call when both a server of an originating party and a server of a terminating party perform the role of participating PTT server.

8. The NNI device of claim 1, wherein the non-transitory computer readable medium further has stored thereon instructions that, when executed by the processor, cause the NNI device to:
   perform, in response to both an originating party server and a terminating party server having a role of controlling PTT server, protocol conversion on communications between the originating party server and the terminating party server, the protocol conversion including information indicating that a first server of the originating party server or the terminating party server is a participating PTT server to a second server of the originating party server or the terminating party server.

9. The NNI device of claim 1, wherein the instructions further cause the NNI device to:
determine whether a second conflict exists between the first PTT system and the one or more second PTT systems in roles performed with respect to PTT floor control during a second PTT call, wherein the conflict exists when the first PTT system and the one or more second PTT systems apply a different standard for whether a PTT server serving a second call originator of the second PTT call takes on a role of a controlling PTT server or a participating PTT server;
in response to determining the conflict exists for the second PTT call, select a second one of the first PTT system and the one or more second PTT systems to perform a role of the controlling PTT server, and wherein the second one of the first PTT system and the one or more second PTT systems is a different PTT system than the first one of the first PTT system and the one or more second PTT systems; and
instruct the second one of the first PTT system and the one or more second PTT systems to perform the role of the controlling PTT server during the second PTT call and the other one of the first PTT system and the one or more second PTT systems to perform a role of the participating PTT server during the second PTT call in response to selecting the first one of the first PTT system and the one or more second PTT systems to perform the role of the controlling PTT server.

10. A method, comprising:
receiving a first push-to-talk (PTT) communication in a first PTT format at a network-to-network interface (NNI) device from a first PTT system;
translating the first PTT communication into a second PTT communication in at least one second PTT format;
transmitting the second PTT communication by the NNI device to at least one second PTT system;
determining, by the NNI device, whether a conflict exists between the first PTT system and at least one second PTT system in roles performed respect to PTT floor control during a PTT call, wherein the conflict exists when the first PTT system and the at least one second PTT system apply a different standard for whether a PTT server serving a call originator of the PTT call takes on a role of a controlling PTT server or a participating PTT server; and
in response to determining the conflict exists for the PTT call, selecting, by the NNI device, a first one of the first PTT system and the at least one second PTT system to perform a role of the controlling PTT server in accordance with system protocol requirements of the first PTT system or the at least one second PTT system, and wherein selecting the first one of the first PTT system and the at least one second PTT system comprises selecting a PTT system of the call originator of the PTT call to perform the role of the controlling PTT server; and
instructing, by the NNI device, the first one of the first PTT system and the at least one second PTT system to perform the role of the controlling PTT server and the other one of the first PTT system and the at least one second PTT system to perform a role of the participating PTT server in response to selecting the first one of the first PTT system and the at least one second PTT system to perform the role of the controlling PTT server.

11. The method of claim 10, further comprising:
emulating an interface of the at least one second PTT system to the first PTT system; and
emulating an interface of the first PTT system to the at least one second PTT system.

12. The method of claim 10, further comprising:
after instructing the first one of the first PTT system and the one or more second PTT systems to perform the role of the controlling PTT server and the other one of the first PTT system and the one or more second PTT systems to perform the role of the participating PTT server, passing through a floor control request from the first one of the first PTT system and the at least one second PTT system acting as the controlling PTT server to the other one of the first PTT system and the at least one second PTT system acting as the participating PTT server.

13. The method of claim 12, further comprising:
determining which of the first PTT system and the at least one second PTT system performs a role of transmitter for a first media burst in a PTT call; and
performing negotiation to cause a first system of the first PTT system and the at least one second PTT system to take the role of transmitter and further to cause a second system of the first PTT system and the at least one second PTT system to take a role of receiver for the first media burst in the PTT call.

14. The method of claim 12, further comprising:
providing, in response to determining that the first PTT system and the at least one second PTT system do not implement a common group addressing scheme, a terminating call leg to one of the first PTT system and the at least one second PTT system using a one-to-one private call protocol implemented by the respective one of the first PTT system and the at least one second PTT system.

15. The method of claim 10, further comprising:
resolving conflicting floor control instructions from one or more systems of the first PTT system and the at least one second PTT system in response to the respective one or more systems not providing a mechanism for negotiation of PTT floor controller role.

16. The method of claim 10, further comprising:
assuming a role of PTT floor controller during the PTT call when both a server of an originating party and a server of a terminating party perform the role of participating PTT server.

17. The method of claim 10, further comprising:
performing, in response to both an originating party server and a terminating party server having a role of controlling PTT server, protocol conversion on communications between the originating party server and the terminating party server, the protocol conversion including information indicating that a first server of the originating party server or the terminating party server is a participating PTT server to a second server of the originating party server or the terminating party server.

18. A network-to-network interface (NNI) device comprising:

a processor;
a non-transitory computer readable medium connected to the processor and having stored thereon instructions that, when executed by the processor, cause the NNI device to:
mediate communications between a first PTT system and a second PTT system;
determine whether a conflict exists between the first PTT system and the second PTT system in roles performed with respect to PTT floor control during a PTT call;
in response to determining the conflict exists for the PTT call, select, by the NNI device, a first one of the first PTT system and the second PTT systems to perform a role of a controlling PTT server to arbitrate floor control requests from the first PTT system and the second PTT system, wherein selecting the first one of the first PTT system and the one or more second PTT systems comprises selecting a PTT system of a call originator of the PTT call to perform the role of the controlling PTT server; and
instruct the first one of the first PTT system and the second PTT system to perform the role of the controlling PTT server and the other one of the first PTT system and the second PTT system to perform a role of a participating PTT server in response to selecting the first one of the first PTT system and the second PTT system to perform the role of the controlling PTT server; and
after instructing the first one of the first PTT system and the second PTT system to perform a role of the controlling PTT server, forwarding a floor control request from the other one of the first PTT system and the second PTT system performing the role of the partici-pating PPT server to the first one of the first PTT system and the second PTT system performing the role of the controlling PTT server.

19. The NNI device of claim 18 further comprising:
a first push-to-talk (PTT) interface adaptor; and
a second PTT interface adaptor, wherein the non-transitory computer readable medium further has stored thereon instructions that, when executed by the processor, cause the NNI device to:
receive a first PTT communication in a first PTT format through the first PTT interface adapter from the first PTT system;
translate the first PTT communication into a second PTT communication in a second PTT format; and
transmit the second PTT communication through the second PTT interface adaptor to the second PTT system.

20. The NNI device of claim 18, wherein the non-transitory computer readable medium further has stored thereon instructions that, when executed by the processor, cause the NNI device to:
provide, in response to determining that the first PTT system and the second PTT system do not implement a common group addressing scheme, terminating call legs to the first PTT system and the second PTT system using a respective one-to-one private call protocol implemented by the respective first PTT system and the second PTT system.

21. The NNI device of claim 18, wherein the conflict exists when the first PTT system and the second PTT system apply a different standard for whether a PTT server serving a call originator takes on a role of the controlling PTT server or the participating PTT server.

* * * * *